US006654027B1

(12) United States Patent
Hernandez (10) Patent No.: US 6,654,027 B1
(45) Date of Patent: Nov. 25, 2003

(54) TOOL FOR THREE-DIMENSIONAL ANALYSIS OF A DRAWING

(75) Inventor: Luc Hernandez, Maisons Laffitte (FR)

(73) Assignee: Dassault Systemes, Suresnes (FR)

( * ) Notice: Subject to any disclaimer, the term of this patent is extended or adjusted under 35 U.S.C. 154(b) by 333 days.

(21) Appl. No.: 09/590,977

(22) Filed: Jun. 9, 2000

(51) Int. Cl.[7] ................................................ G09G 5/00
(52) U.S. Cl. ........................ 345/619; 345/581; 345/782; 345/821; 345/822; 345/823; 345/850
(58) Field of Search ................................ 345/771, 782, 345/850, 551, 964, 619, 664, 804, 821–823, 767, 419, 581, 650, 661–665, 653, 672, 676

(56) References Cited

U.S. PATENT DOCUMENTS

| | | | | |
|---|---|---|---|---|
| 4,868,766 A | * | 9/1989 | Oosterholt | 345/420 |
| 5,815,154 A | * | 9/1998 | Hirschtick et al. | 345/853 |
| 6,256,595 B1 | * | 7/2001 | Schwalb et al. | 703/1 |
| 6,285,369 B1 | * | 9/2001 | Kross et al. | 345/419 |
| 6,295,069 B1 | * | 9/2001 | Shirur | 345/420 |
| 6,323,859 B1 | * | 11/2001 | Gantt | 345/419 |

* cited by examiner

Primary Examiner—Kristine Kincaid
Assistant Examiner—Nhon Nguyen
(74) Attorney, Agent, or Firm—Joseph Levi; Clifford Chance US LLP (57) ABSTRACT

A method and system for assisting a user in identifying an element of an object in various displayed views in a drawing of the object. A method is employed that will allow automatic highlighting of a selected edge of an object in each view, as well as separately highlighting the edges of faces of an object adjoining the selected edge. The process facilitates the user's comprehension of the three dimensional geometry of the object. The invention is particularly suited to computer-aided design, computer aided manufacturing, and computer aided engineering.

16 Claims, 7 Drawing Sheets

(*)   THE VIEW THAT WILL RECEIVE ALL NEW CREATED OBJECT (GEOMETRY, ANNOTATIONS)
(**)  GEOMETRY COMING FROM A 3D PART
(***) GEOMETRY CREATED WITH 2D GEOMETRY COMMANDS (LINE, ARC, CIRCLE...)
(****) SEE DETAILS IN THE FIG. 7 FLOW CHART

TOOL FOR THREE-DIMENSIONAL ANALYSIS OF A DRAWING

BACKGROUND

The present invention relates to computer software utility programs, and more specifically to programs in the field of computer-aided design (CAD), computer aided manufacturing (CAM), and computer aided engineering (CAE). More generally, it relates to the display of multiple views of an object as seen from different positions with respect to the object.

In CAD/CAM/CAE systems, parts or objects can be designed using three dimensional modeling software. An object designed using such software is composed of a number of faces, each of which has a set of edges. The information related to the decomposition of a three dimensional ("3D") solid into faces, edges and vertices, and the logical relationships between these elements, is known as topological information, and is stored in topological journals.

In the field of CAD/CAM/CAE various tools are available to a designer for the purpose of facilitating the design and analysis of an object or part. Once the object has been finally designed, a drawing is created to be sent to a machinist or supplier for the purpose of giving the machinist or supplier the information that is necessary to make the object. A drawing can contain various two dimensional projections of a part, such as for example, a top view, a left-side view, a right-side view, a bottom view, etc., and normally contains several different projected, cutting or detailed views of an object. These drawings are created so as to comply with various industry standards, such as ISO, JIS, and ANSI, for example, so that all the necessary information is provided to the machinist for making the part. Typically, the drawing is supplied in electronic format.

To simplify the job of a drafter, tools exist that automatically create a final two dimensional drawing for an object, in the proper format and convention so as to be understood by the machinist or supplier, from the three-dimensional model. The result is a drawing having "generative" views, which inherit some topological information contained in the initial 3D solid model. Additionally, a 3D representation of the object, which corresponds to the outer shell of the body, is usually extracted from the 3D solid model, and has an associated subset of topological information. This 3D representation is usually displayed in a 3D viewer. It makes drawing and 3D representations independent from the 3D solid model.

However, in a drawing, the geometry represented is a wireframe representation of the 3D solid projected into a drawing view, and has no semantic (such as face or edge); it is a collection of line segments. The relationships between line segments in a drawing and edges or faces in a 3D solid are established through tables associating each line segment in a view to an edge. Face identification is then performed from edges through the topological journals. In this document, when reference is made to edges or faces in a drawing view, it should be understood that what is referred to is line segments representing these edges or faces.

When an object has a complex geometry it can be difficult to keep track of the various faces and features of an object when displayed in various views of the drawing. This can lead to uncertainty and confusion. The more complex an object, the more severe the problem. For example, a supplier may receive a drawing with twenty or more views of the object. It can be extremely difficult for a person to understand and track an aspect of the geometry of an object in different views.

Therefore, there is a need to provide the user with visual clues that identify common portions of an object when displayed in different views in a drawing. This would aid the user to visualize the object and its features more clearly and definitely.

SUMMARY OF THE INVENTION

Accordingly, the present invention provides a system, method, and apparatus for providing a visual tool showing correspondence between views of the same portion of an object in every view of a drawing.

According to the invention, a user may select a specific portion or feature of an object. When such selection is made, the portion or feature of the object is automatically highlighted in each of the other views being displayed. In the preferred embodiment, this portion or feature is also highlighted in a window where the object is represented in three dimensions.

In the preferred embodiment of the invention, the user may select a specific edge of an object in one of the views by moving a cursor over the edge. Immediately upon selection of the edge by the user in one view, it is highlighted in each of the other views being displayed. In addition, in another aspect of the invention, when the user selects an edge, the faces of the object that adjoin the edge are also highlighted, both in the view selected by the user, and in each of the other views. The edges and adjoining faces are highlighted differently so as not to confuse the user. In the preferred embodiment, the selected edge is highlighted in blue, and faces adjoining the selected edge are distinguished by highlighting each of their edges in red. This provides the user with much needed cross-referencing information between views, thus facilitating comprehension of the drawing.

DETAILED DESCRIPTION OF THE INVENTION

Figure 1:
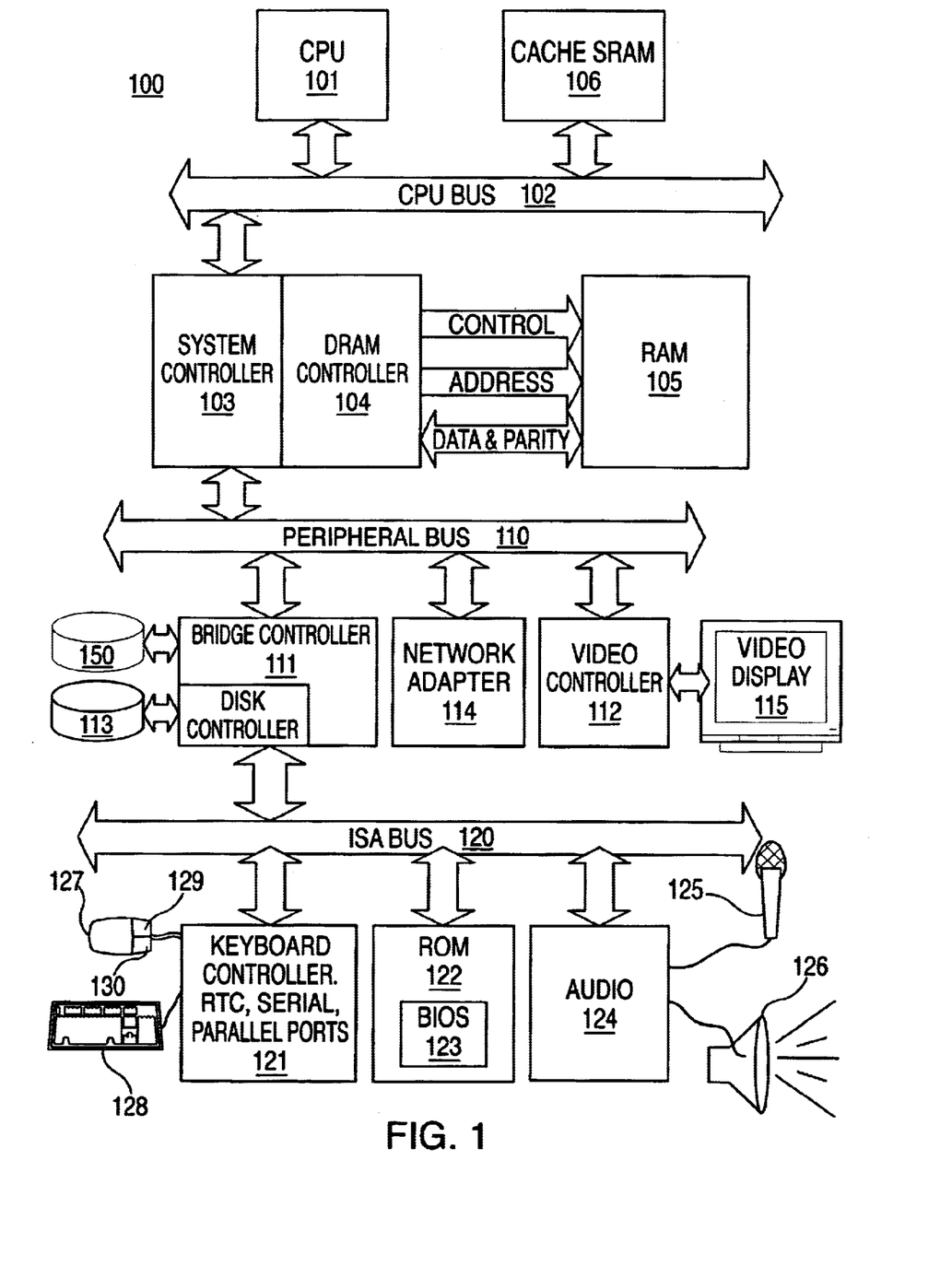
FIG. 1 is a block diagram of a computer system capable of use with the present invention.

Referring to FIG. 1, physical resources of a computer system 100 capable of use in practicing the present invention are depicted. The computer 100 has a central processor 101 connected to a processor host bus 102 over which it provides data, address and control signals. The processors 101 may be any conventional general-purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, LINUX, the Apple MacOS® operating system, or other operating system.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to display drawings and representations of objects on the video computer display 115.

Figure 2:
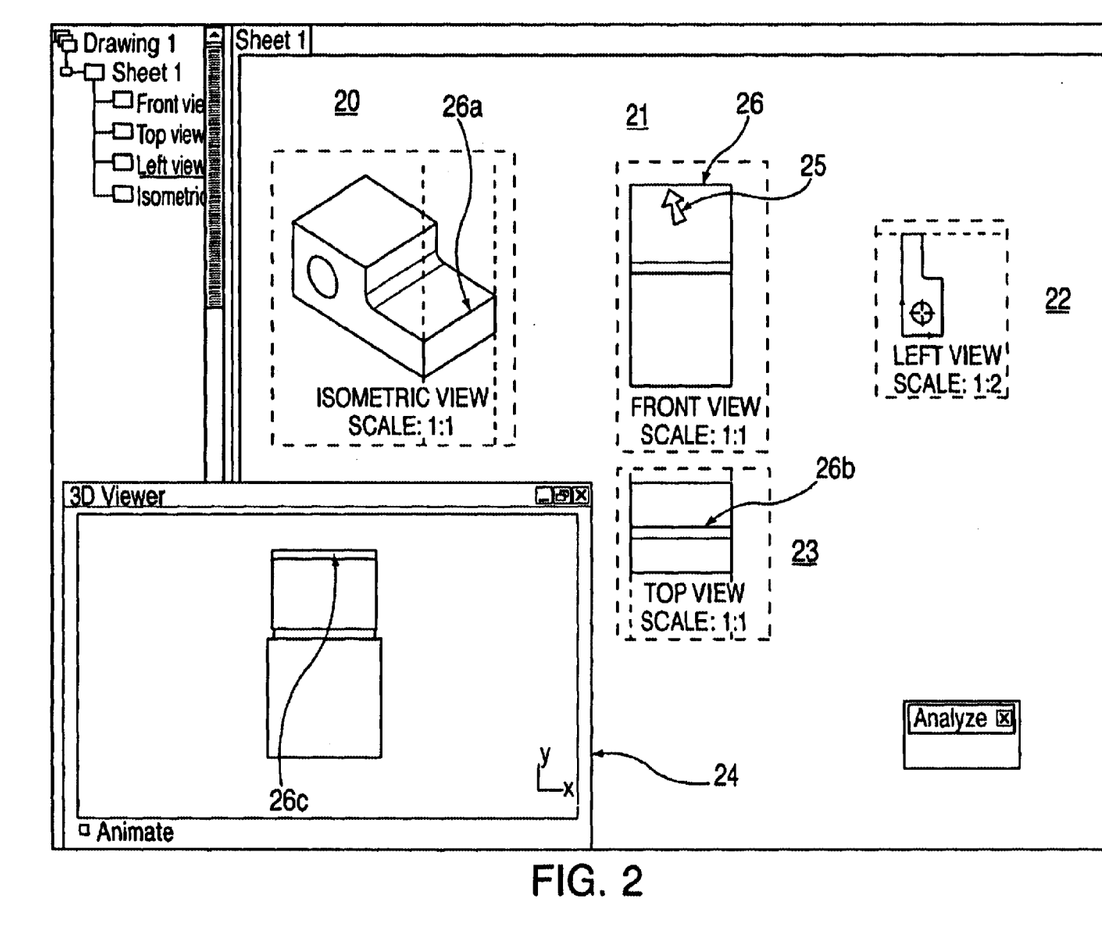
FIG. 2 is an example of a graphic display, according to an aspect of the invention, showing two-dimensional projections of an object, an isometric projection, and a three-dimensional viewer window.

Referring to FIG. 2, an example of a graphic display of an object according to the present invention is shown. The display shows depictions of the object from various perspectives. For example, the object is shown as an isometric projection 20, and the front 21, left$_{13}$ 22 and top 23 views are shown. It is to be understood that other views could also be shown, such as the right, back and bottom views. In addition a three dimensional representation of the object is shown in a separate window 24 ("3D viewer" ). In the three dimensional viewer, the object can be rotated in three dimensions according to the user's instructions to visualize the object from whatever perspective the user prefers.

In the preferred embodiment, each time the user moves the cursor onto a new view of the drawing, the vantage point of the 3D viewer realigns so that it matches that of the view on which the cursor is placed. This realignment feature may be turned on or off, at the user's preference.

Focusing on the front view 21, it can be seen that the user has placed a cursor 25 on the front view 21 and has positioned the cursor so that it points to an edge 26 of the object in the drawing. In the preferred embodiment of the invention, the selected edge 26 will be displayed in blue so as to highlight it in contrast to the other edges being displayed, although any manner of distinguishing the edge from other edges in the drawing are within the scope of the invention. In addition, in accordance with the invention, the selected edge will be highlighted in each of the other displayed views. In FIG. 2, these edges are denoted as 26a in the isometric view 20, 26b in the top view 23 and 26c in the 3D viewer.

In the preferred embodiment, an edge is selected simply by moving the cursor over the desired edge in any view. In other words, no separate action, such as clicking a button on a mouse, is needed. In this way, highlighting of an edge in every view is done automatically and quickly. The user can quickly move the cursor from edge to edge, and view to view, and the highlighting in all the views will automatically change as the cursor moves from edge to edge in any view. It should be understood that the process by which the user selects an edge or feature can be accomplished in many other ways. For example, the addition of the clicking of a mouse to select an edge is within the scope of the invention, as well as keyboard input, pull-down menu options, or other means. It should also be understood that in the preferred embodiment, highlighting of the selected edge is accomplished not only in every view of the drawing, but also in the 3D viewer.

Figure 3:
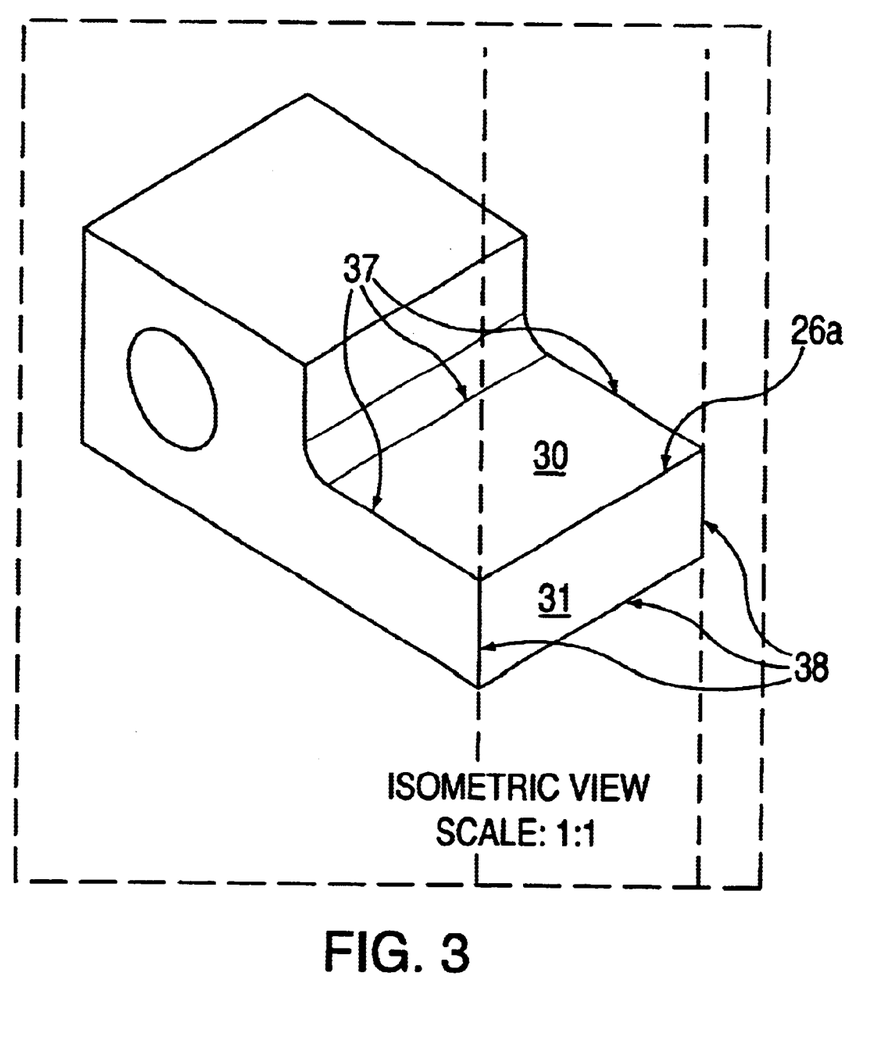
FIG. 3 is an enlarged view of the isometric projection of FIG. 2, showing the highlighting of the selected edge, as well as the highlighting of edges of faces adjoining the selected edge.

FIG. 3 shows the isometric projection of FIG. 2 in enlarged form. The selected edge is 26a. Edge 26a, which in the preferred embodiment of the invention becomes highlighted in blue as a result of the selection, is an edge of two adjoining faces, namely, faces 30 and 31. In the preferred embodiment of the invention, the remaining edges of faces 30 and 31 are highlighted so as to provide more visual guidance to the user. Therefore, in FIG. 3, the edges 37 of face 30 are highlighted in red, and the edges 38 of face 31 are also highlighted in red.

Figure 4:
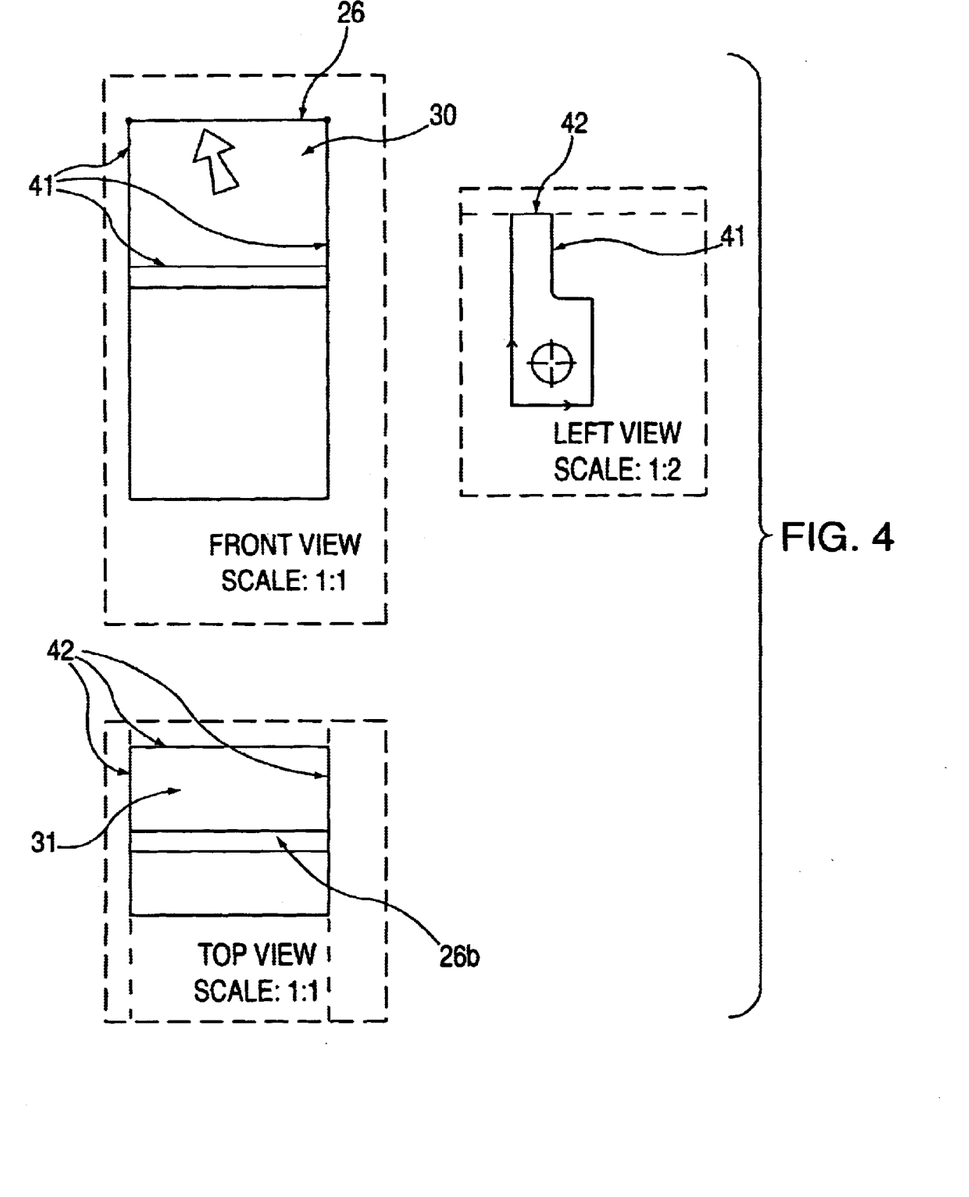
FIG. 4 is an enlarged view of the front, left and top views of FIG. 2, showing the highlighting of the selected edge, as well as the highlighting of edges of faces adjoining the selected edge.

FIG. 4 is an enlargement of the front, top and left views of FIG. 2. The selected edge 26 appears in the front view (see 26) and top view (see 26b), but not in the left view. According to the invention, in both the front and top views, the selected edge is highlighted so as to distinguish it from the rest of the edges in the views. Likewise, the visible edges of the faces adjoining the selected edge are highlighted in a manner so as to distinguish them from the selected edge as well as the rest of the edges. In the preferred embodiment, this is done by highlighting them in red. Thus, in the front view, the three non-selected edges 41 of face 30 are highlighted in red. Likewise, in the top view the three non-selected edges 42 of face 31 are highlighted in red. Finally, in the left view, the one visible edge 42 of face 31 is red, and the one visible edge 41 of face 30 is red.

To summarize, in the preferred embodiment, in any view that is displayed, the edge selected by the user, if visible, will be colored blue, and the edges of adjoining faces, if visible, will be colored red. This provides the user with an immediate aid in distinguishing the features of the object, thereby enabling faster and more accurate comprehension of its geometry by the user.

Figure 5:
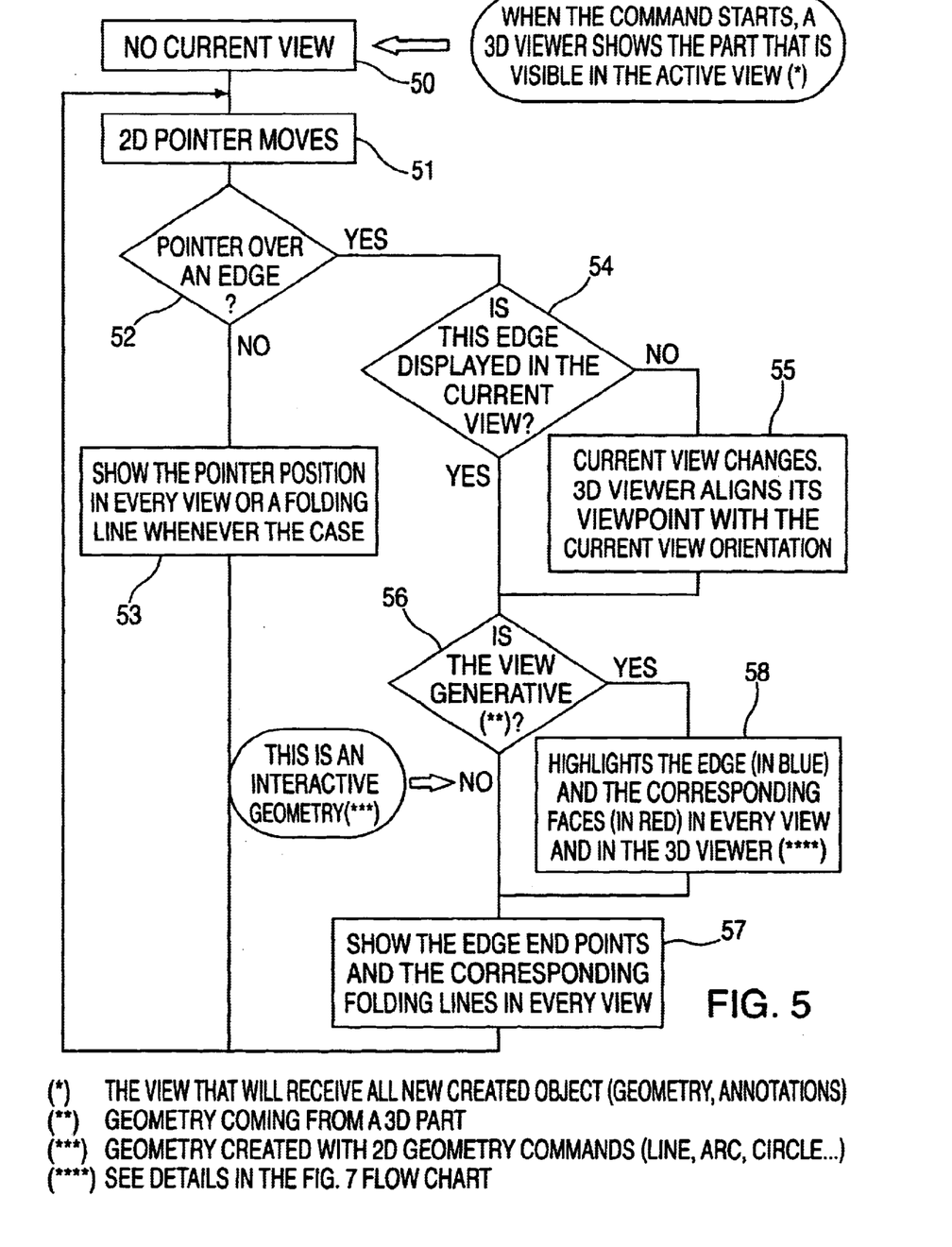
FIG. 5 is a schematic representation of an aspect of the method of the preferred embodiment of the invention, in flow chart form.
Figure 6:
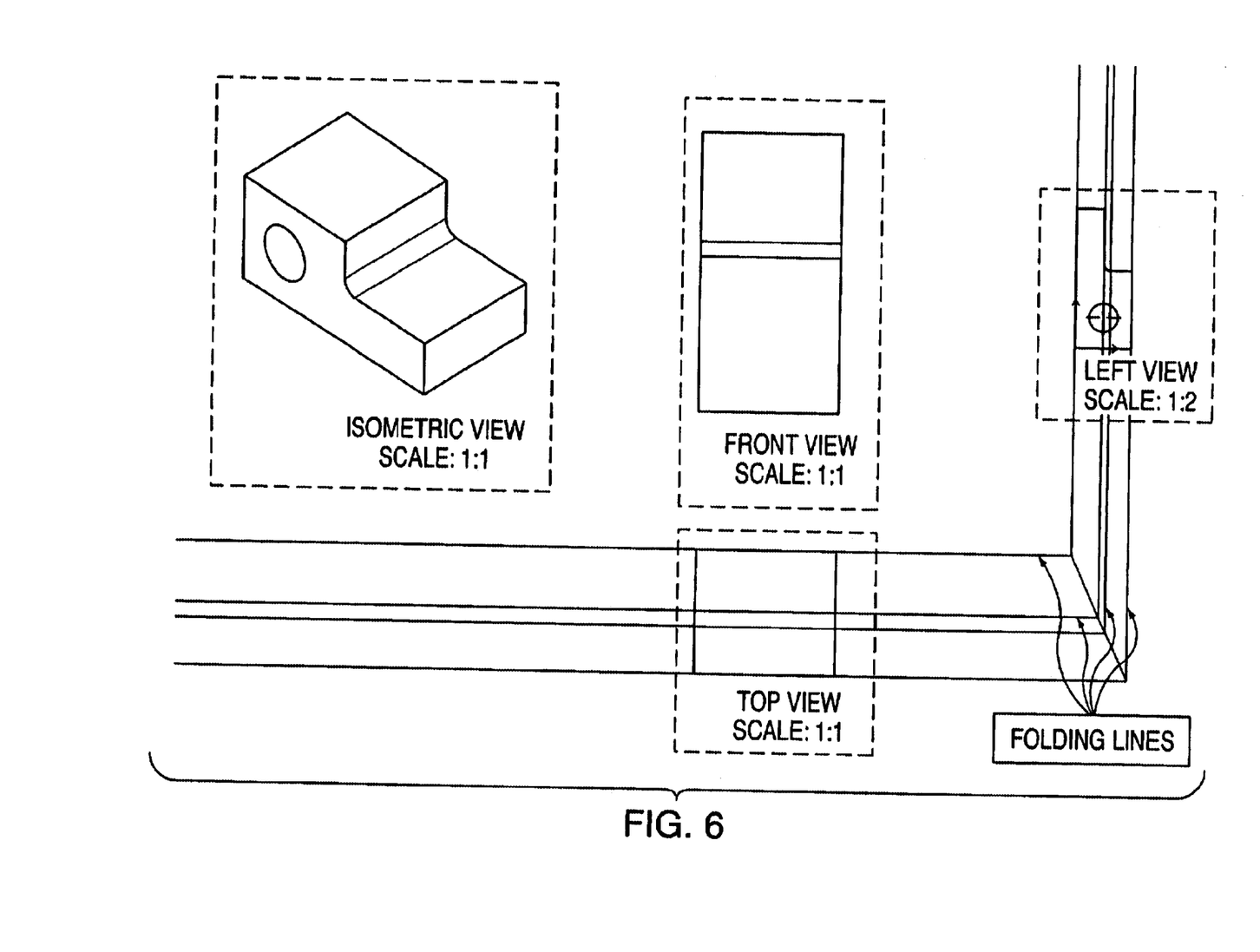
FIG. 6 illustrates a graphic display of folding lines, according to an aspect of the invention.

FIG. 5 is a flow chart illustrating the preferred method used to determine highlighting in the preferred embodiment. In FIG. 5 we begin with a drawing containing several views, and a 3D viewer showing the object in a separate window. We begin with the state where the user has not placed the pointing device, or cursor, on any view or edge (step 50), in which case nothing is highlighted. When a signal is received indicating that the cursor has moved 51, an inquiry is made as to whether or not the cursor is on an edge of the object (step 52). If the answer is "no" then the system shows the position of the cursor relative to the object in each view. The position of the cursor can be represented by a simple cross or by a folding line. To see a cross in a view, this view must be parallel to the view where the cursor is. For example, a front view and a rear view are parallel, a top view and a bottom view are parallel, a right view and a left view are parallel. A folding line representing the track of the cursor is displayed in other cases, when views are not parallel (step 53). FIG. 6 is a graphic illustration showing folding lines between views. These folding lines link common edges of an object between views, and are another useful device for assisting the user in visualizing an object in three dimensions.

Referring again to the flow chart of FIG. 5, in the event that the pointer is an edge (step 52, "yes"), an inquiry is made as to whether or not the selected edge is an edge of the current view (step 54). In the preferred embodiment, the current view is the view where the cursor was previously. If the answer is "no", then the current view changes so that the view selected by the user becomes the current view, and in addition, the 3D viewer realigns the 3D depiction of the object so that it is consonant with the selected view (step 55). It is to be understood that the resetting of the current view and the 3D viewer are each useful features of the preferred embodiment of the invention, which enhance the user interface, but need not be performed in every case.

Once it has been determined that the selected edge is in the current view, and the 3D viewer has been realigned to correspond to the current view, an inquiry is made as to whether or not the selected view is a "generative" view (step 56). A generative view is a two dimensional view of the drawing that was automatically generated from the three dimensional model. Users may choose to create other views directly as a drawing, in which case the view is called non-generative, or "interactive."

If the selected view is a generative view (step 56, "yes"), then a method is employed, to be described below with reference to FIG. 7, whereby the selected edge is highlighted in blue in every view, including the 3D viewer, and the edges of faces adjoining the selected edge are highlighted in red in every view, including the 3D viewer (step 58). All other edges remain un-highlighted. The details of the method of step 58 of the preferred embodiment of the invention are described with reference to FIG. 7.

In the event that the view is not a generative view (step 56, "no"), then the selected edge is highlighted in blue, and folding lines are displayed linking the end points of the selected edges and the corresponding edges in every view (step 57).

Figure 7:
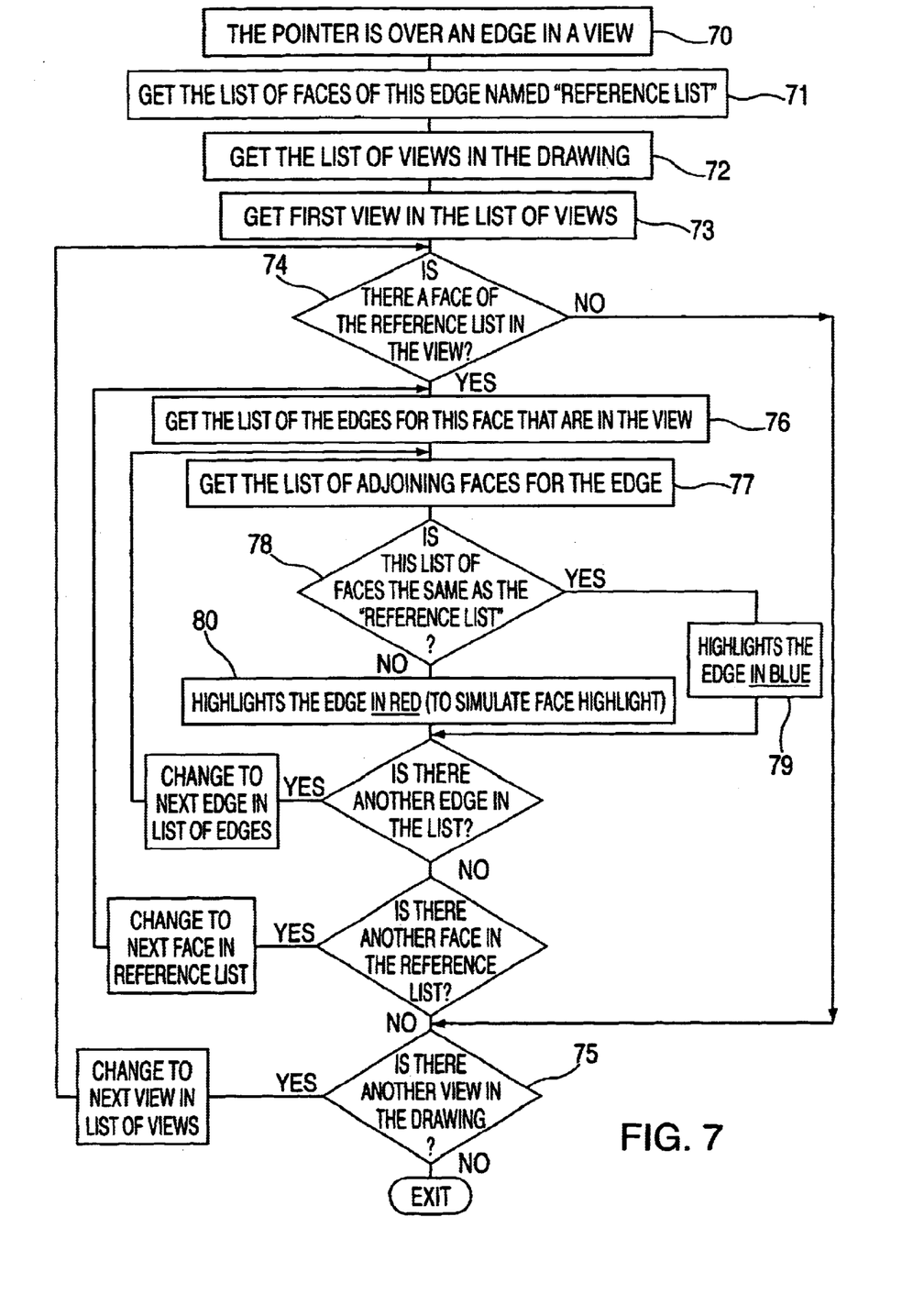
FIG. 7 is a schematic representation, in flow chart form, of the method employed in the preferred embodiment for determining the highlighting of edges according to the present invention.

FIG. 7 depicts the method of the present invention in flow chart form for highlighting the selected edge and edges of adjoining faces in every view. Therefore, according to the method of the invention, whenever it is discerned that the cursor is on an edge (step 70), a list of the faces adjoining the selected edge is obtained. This information is discerned from a database listing, for each edge, the faces that adjoin the edge (step 71). This list of faces, two faces in most cases, will be referred to as the "reference list". In addition, a list of views in the drawing is obtained (step 72), and one of the views is selected as a starting point (step 73). The following process is then completed in iterative fashion for each view, using the reference list as a base.

The initial inquiry that is made is whether or not a face of the reference list is displayed in the view. If not (step 74, "no"), that means that there is no edge displayed in the view that should be highlighted, in which case the highlighting portion of the method is skipped for this view, and the method proceeds to the next view (step 75). If there is a face of the reference list in the view (step 74, "yes"), then the first face in the "reference list" is selected, and its list of edges that are in the view is obtained from the database (step 76). For each of these edges, a list of faces adjoining the edge is obtained (step 77). A query is then made for each edge as to whether the list of faces for the edge is the same as the list of faces in the reference list (step 78). If so, then the edge is highlighted in blue, designating it as the current edge (step 79). If the answer is "no", meaning that the list of faces does not correspond exactly to the reference list of faces, then the edge is highlighted in red, indicating that it is an edge of one of the faces adjoining the selected edge, but is not the selected edge itself (step 80).

This process is then repeated for the next face in the reference list. As indicated above, this process is repeated for each view. In addition, each time a new edge is selected by the user, the entire process as a whole is repeated.

It should be noted that since the highlighting of edges is made using only the reference list, only edges having correspondence to faces adjoining the selected edge will be eligible for highlighting. All other edges remain un-highlighted, or black in the preferred embodiment.

It is to be understood that the foregoing method can be applied to any object in any configuration capable of being defined by a CAD/CAM/CAE system, or any system used to display views of an object from varying viewpoints. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented progranmming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

The preferred embodiment of the present invention has been described. It will be understood that various modifications may be made without departing from the spirit and scope of the invention. Therefore, other implementations are within the scope of the following claims.

What is claimed is:

1. A computer system operation method for use with a system capable of displaying a plurality of views of an object taken from different vantage points, the method comprising:
    displaying simultaneously at least two views of said object wherein at least one of said at least two views is a two-dimensional view;
    receiving input from a user selecting a representation of an edge of said object; and altering the appearance of the corresponding representation of said edge in each of said at least two views in which said edge is visible to make the selected edge distinguishable from the remainder of the object.

2. The method of claim 1, wherein at least one of said at least two views is a three-dimensional view.

3. The method of claim 2, wherein when said user selects said element in said two-dimensional view, said two-dimensional view having a particular one of said different vantage points, the method further comprises the step of:
    realigning said three-dimensional view to said particular one of said different vantage points.

4. The method of claim 3, wherein the step of realigning is user-selectable.

5. The method of claim 1, wherein said input received from said user is said user moving a cursor over said element.

6. The method of claim 1, wherein said user selects said representation of said element of said object in any of said at least two views.

7. The method of claim 1, wherein each of said plurality of views of said object have a common edge and wherein the method further comprises the step of:
    displaying a plurality of folding lines wherein said plurality of folding lines link said common edges.

8. A computer system operation method for use with a system capable of displaying a plurality of views of an object taken from different vantage points, the method comprising:
    displaying simultaneously at least two views of said object wherein at least one of said at least two views is a two-dimensional view;
    receiving input from a user selecting a representation of an edge of the object;
    altering the appearance of the representation of the selected edge of the object in the current view to make the selected edge visually discernable from the remainder of the object;
    altering the appearance of the corresponding representation of the selected edge of the object in each other displayed view in which it is visible to make the selected edge visually discernable from the remainder of the object;
    altering in the current view the appearance of the representation of the edges of faces of the object that adjoin the selected edge to make the adjoining faces visually discernable from the remainder of the object and from the selected edge; and
    altering the appearance of the corresponding representation of the edges of faces of the object that adjoin the selected edge in each other displayed view in which they are visible to make the adjoining faces visually discernable from the remainder of the object and from the selected edge.

9. The method of claim 8, wherein the method of altering the appearance of the representation of the selected edge comprises changing its displayed color.

10. The method of claim 8, wherein the step of altering the representation of the edges of faces of the object that adjoin the selected edge further comprises the steps of:
    identifying the edges of faces adjoining the selected edge by obtaining from a database a list of faces adjoining the selected edge;
    storing said list of faces; and
    obtaining from a database a list of the edges for each face in said stored list.

11. A computer data signal embodied in a digital data stream comprising data representing the physical configuration of an object, data for displaying simultaneously at least two views of said object with at least one of said two views being a two-dimensional view, and data discerned from user input specifying an edge of said object to be displayed in a manner distinguishing said edge from the remainder of said object in each of said at least two views.

12. A computer data signal embodied in a digital data stream comprising data representing the physical configuration of an object, data for simultaneously displaying at least two views of said object with at least one of said two views being a two-dimensional view, data discerned from user input specifying an edge of said object to be displayed in a manner distinguishing said edge from the remainder of said object in each of said at least two views, and data specifying edges of faces adjoining said selected edge to be displayed in a manner distinguishing said edges of faces from the remainder of said object in each of said at least two views.

13. A CAD/CAM apparatus comprising:
    an input device;
    a central processing unit;
    a memory device for storing data; and
    a display device;
    wherein the central processing unit runs an application program comprising code for obtaining data pertaining to the shape of an object, displaying simultaneously at least two views of said object with at least one of said two views being a two-dimensional view, discerning from user input an edge of said object selected by said user, and altering the representation of the object in each of said at least two views so as to distinguish the representation of the selected edge of the object from the representation of the remainder of the object in each of said at least two views.

14. A computer system operation method for use with a system capable of displaying a plurality of views of an object taken from different vantage points, the method comprising:
    displaying simultaneously at least two views of said object with at least one of said two views being a two-dimensional view;
    receiving input from a user selecting a representation of an edge of said object;

accessing a database containing information relating to the three-dimensional configuration of said object;

determining from said database the location in each view of the representation of the edge of the object corresponding to the representation of the edge selected by the user; and altering the appearance of the corresponding representation of said edge in each view in which said representation of said edge is visible to make the selected edge distinguishable from the remainder of the object.

15. A computer system operation method for use with a system capable of displaying a plurality of views of an object taken from different vantage points, the method comprising:

displaying simultaneously at least two views of an object with at least one of said two views being a two-dimensional view;

receiving input from a user selecting a representation of an edge of the object;

accessing a database containing information relating to the three-dimensional configuration of the object;

determining from said database the location in each view of the representation of the edge of the object corresponding to the representation of the edge selected by the user, and the location in each view of the representation of the edges of faces of the object that adjoin the selected edge; and altering the appearance of the corresponding representation of the selected edge of the object, and the representation of the corresponding edges of faces of the object that adjoin the selected edge, in each view in which they are visible, to make them visually discernable from the remainder of the object.

16. A computer system operation method for use with a system capable of displaying a plurality of views of an object taken from different vantage points, wherein each of said plurality of views of said object have a common edge, the method comprising:

displaying simultaneously at least two views of said object wherein at least one of said at least two views is a two-dimensional view;

receiving input from a user selecting a representation of an element of said object;

altering the appearance of the corresponding representation of said element in each of said at least two views in which said element is visible to make the selected element distinguishable from the remainder of the object; and displaying a plurality of folding lines wherein said plurality of folding lines link said common edges.

* * * * *